Patented Dec. 14, 1948

2,456,588

UNITED STATES PATENT OFFICE 2,456,588

PROCESS FOR PRODUCTION OF ORGANIC MERCAPTANS

Anthony Loverde, Niagara Falls, N. Y., assignor to Hooker Electrochemical Company, Niagara Falls, N. Y., a corporation of New York No Drawing. Application May 24, 1945, Serial No. 595,656

1 Claim. (Cl. 260—609)

My process relates more particularly to production of aralkyl mercaptans of one or more carbon rings and one or more alkyl groups, such as mercaptans of methyl substituted benzene, by reaction of the corresponding chlorides with an alkali metal hydrosulphide, in accordance with the following known reaction:

$$RCl + R'HS \rightarrow RSH + R'Cl \qquad (1)$$

in which R may be an aralkyl radical and R' any alkali metal.

It is known that aralkyl chlorides may be reacted with an alkali metal hydrosulphide in aqueous solution, at 70° to 150° C., with refluxing, with the aid of methyl or ethyl alcohol, under substantial pressure, or in the absence of such a solvent, with the aid of mechanical agitation, at atmospheric pressure, to form the corresponding mercaptans. However, the mercaptan is liable to become more or less oxidized by contact with the air during the reaction or afterward, to form the corresponding diaralkyl disulphide, as follows:

$$4RSH + O_2 \rightarrow 2RSSR + 2H_2O \qquad (2)$$

The object of my invention is therefore to improve the yield of reaction (1) by minimizing formation of the disulphide, during the reaction and afterward.

I have now found that if reaction (1) be carried out in presence of an anti-oxidant, reaction (2) is hindered or prevented. The result is a substantial improvement in yield of the mercaptan.

For my purpose any anti-oxidant that is miscible with the product, such as a higher alcohol, cyanide, ketone, ether or amine, may be used and if some of this be left in or added to the product, the latter is thereby rendered more stable against subsequent oxidation.

Example I 3500 grams of NaSH were dissolved in 4 liters of waters and heated to refluxing temperature. 4410 grams of benzyl chloride were added slowly with agitation and refluxing, which were continued for 8 hours. The non-aqueous layer was then separated from the aqueous layer and distilled. 3170 grams of product were recovered, representing a yield of 73 per cent of theoretical based on the benzyl chloride.

Example II

The reaction of Example I was carried out in presence of 3.5 grams of hydroquinone. 3394 grams of product were obtained, representing a yield of 78 per cent based on the organic reagent.

Example III

The reaction of Example I was carried out in presence of 3.5 grams of KCN. The yield of product was 82 per cent based on the organic reagent.

Example IV

The reaction of Example I was carried out in presence of 15 grams of dichlor ethyl ether. The yield was 85.5 per cent based on the organic reagent.

Example V

The reaction of Example I was carried out in presence of 15 grams of glycerine. The yield was 86 per cent based on the organic reagent.

A comparison of Examples II, III, IV and V with Example I shows that the presence of an anti-oxidant during the reaction improves the yield of aralkyl mercaptan to a marked extent.

Other anti-oxidants that I have tried with favorable results are acetyl amine and naphthyl amine.

In the following claim, it is to be understood that by "anti-oxidant" is meant an agent which acts catalytically to inhibit oxidation, without itself becoming oxidized, in distinction from reducing agents, which do not inhibit oxidation, but merely hinder it, by taking up a part of the oxygen themselves.

I claim as my invention:

The process for production of benzyl mercaptan by reaction of benzyl chloride with an alkali metal hydrosulphide in a two phase system, with relatively high yield thereof, which comprises adding the organic chloride gradually, with agitation and refluxing, to a solution consisting of the hydrosulphide dissolved in water, in presence of a small quantity of dichlor ethyl ether, the hydrosulphide being in substantial molecular excess of the final quantity of organic chloride; continuing the refluxing until the reaction is complete; and recovering the organic layer from the inorganic layer.

ANTHONY LOVERDE.

REFERENCES CITED

The following references are of record in the file of this patent:

UNITED STATES PATENTS

| Number | Name | Date |
|---|---|---|
| 1,822,449 | Nonamaker | Sept. 8, 1931 |
| 1,842,414 | Leaper | Jan. 26, 1932 |
| 2,085,452 | Salzberg | June 29, 1937 |
| 2,150,475 | Winans | Mar. 14, 1939 |
| 2,346,102 | De Simo | Apr. 4, 1944 |
| 2,395,240 | Wirth | Feb. 19, 1946 |

OTHER REFERENCES

Chemical Abstracts, vol. 7, page 2192, Abstracts of Article by Smythe.